United States Patent
Marella et al.

[11] Patent Number: 6,156,685
[45] Date of Patent: Dec. 5, 2000

[54] ZIRCONIA CERAMIC FIBERS PARTIALLY STABILIZED WITH YTTRIA AND FUNCTIONALIZED FOR CATALYTIC APPLICATIONS WITH A COATING CONTAINING ZIRCONIA, OBTAINED BY A SOL-GEL PROCESS

[75] Inventors: Marcello Marella; Letizia Meregalli; Michele Tomaselli, all of Venice, Italy

[73] Assignee: Enirisorse S.p.A., Rome, Italy

[21] Appl. No.: 09/098,737

[22] Filed: Jun. 18, 1998

[30] Foreign Application Priority Data

Jun. 20, 1997 [IT] Italy ................... MI97A1464

[51] Int. Cl.⁷ ............... C04B 35/48; C04B 35/624
[52] U.S. Cl. ............... 501/95.1; 501/103; 501/105; 423/608
[58] Field of Search .................. 428/403, 404; 501/95.1, 103, 105, 12; 423/608

[56] References Cited

U.S. PATENT DOCUMENTS 4,753,904  6/1988  Wolfe ........................... 501/105
4,937,212  6/1990  Funkenbusch et al. ........... 501/103

FOREIGN PATENT DOCUMENTS 403083856  4/1991  Japan.

*Primary Examiner*—Paul Marcantoni
*Attorney, Agent, or Firm*—Oblon, Spivak, McClelland, Maier & Neustadt, P.C.

[57] ABSTRACT

Zirconia ceramic fibers, for catalytic applications, partially stabilized with yttria by means of a particular sol-gel process, are functionalized with a coating, containing zirconia and, optionally, alumina and/or oxides of Cu, Ni, Co, V, Mo, W, Ce, La, Nd and/or noble metals selected from Rh, Pt, Pd, Ru, Au, mainly obtained with a "dip coating" technique.

33 Claims, 1 Drawing Sheet

FIG. 2
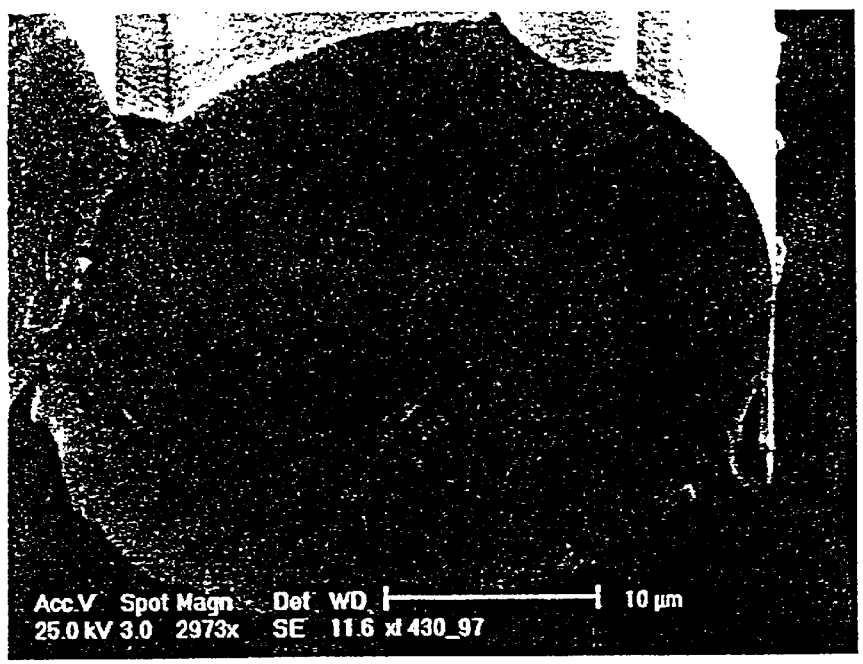
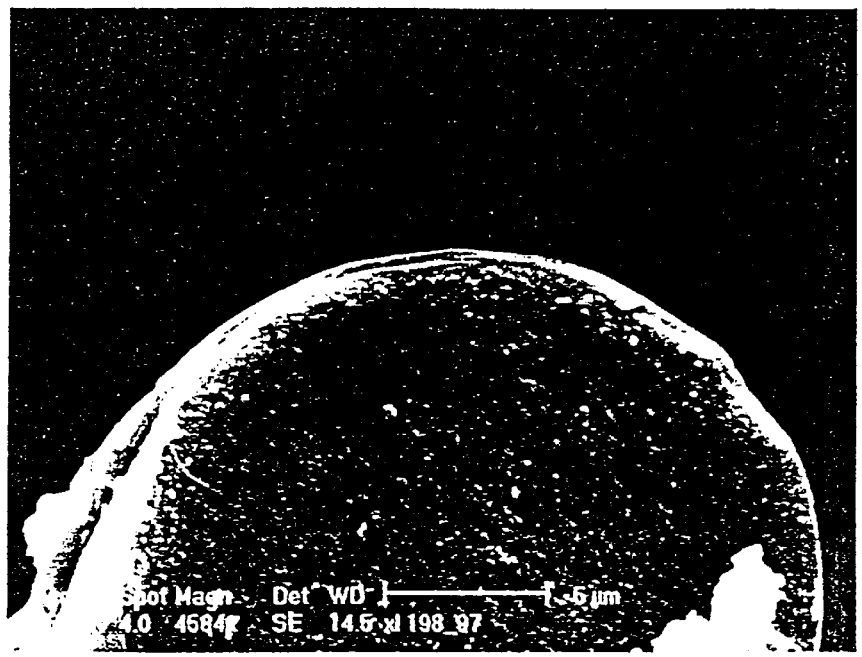
FIG. 1

ZIRCONIA CERAMIC FIBERS PARTIALLY STABILIZED WITH YTTRIA AND FUNCTIONALIZED FOR CATALYTIC APPLICATIONS WITH A COATING CONTAINING ZIRCONIA, OBTAINED BY A SOL-GEL PROCESS

The present invention relates to zirconia ceramic fibres partially stabilized with yttria, obtained by means of sol-gel synthesis, and functionalized with a coating containing zirconia, mainly obtained with a "dip coating" technique.

The composite fibres thus obtained are capable of supporting a variety of oxides of transition elements and precious metals, to be used in numerous applications in the field of catalysis.

Among the production methods of ceramic fibres, sol-gel synthesis processes are technologically the most interesting for two main reasons:
- the purity of the reagents and the mixing of all the components on an atomic scale;
- the reactivity of the xerogel precursors which allows the synthesis of any kind of fibre, and in particular zirconia, at temperatures hundreds of degrees lower than those used with the more traditional ceramic techniques, which comprise a melting step of the component.

The first reason is of fundamental importance in the field of catalysis, in which the purity of the compositions is necessary, as any additive, such as those normally added to ceramic compositions ("sintering aid"), can risk jeopardizing the efficiency of the catalytic system.

The second is, viceversa, important from an economical point of view for the process.

It should be pointed out, however, that the majority of sol-gel processes use particularly costly precursors of elements of interest based on alkoxides or their organometallic compounds. These synthesis processes are illustrated as claimed in Japanese patent J01/230443 of Nippon Sheet Glass Co., where the basic metals are Si, B, Ti, Zr or Al.

International literature cites various preparation processes of zirconia fibres based on non-alkoxidic systems:
- E. Leroy et al. [Comm. Eur. Communities, Rep. EUR 9210, Ceram. Adv. Energy Technol., (1984) 501] describe a method for the preparation of zirconia fibres starting from solutions of zirconium acetate concentrated so as to obtain short fibres by extrusion and air-jet spinning;
- H. Kim et al. [Yoop Hakhoechi, 23 (1986) 78] describe a method which again uses solutions of zirconium acetate, obtained starting from zirconium oxychloride, condensed, polymerized and extruded to fibres;
- again H. Kim et al. in another work [Yoop Hakhoechi, 29 (1992) 544] illustrate a method for preparing zirconia fibres by extruding, starting from a polyester sol containing zirconyloxychloride, during the reaction between ethylene glycol and citric acid;
- D. C. Agrawal et al. [Trans. Indian Ceram. Soc. 52 (1993) 16] induce the gelation of zirconia fibres by the monodirectional freezing of a hydrogel: the length of the fibres obtained depends on the aging period of the hydrogel;
- finally, N. K. Naskar et al. [J. Mater. Sci 31 (1996) 6263] describe a method in which a sol based on acetates, to which hydrogen peroxide is added and which is then seasoned, first at 5° C. and then at 70–80° C., is extruded and thermally gelified.

It has been surprisingly found that it is possible to obtain an immediate gelation of a sol based on zirconium and yttrium nitrates, with a final composition expressed in oxides equal to 93–97% of $ZrO_2$ and 7–3% of $Y_2O_3$, known as partially stabilized zirconia or PSZ, immediately downstream of the extrusion outlet if this is immersed in a gelation bath consisting of an aqueous solution of ammonia.

The gel fibres have a consistency which is sufficient for them to be wound and stretched by a first winding unit, even if the residence time in the gelation bath does not exceed 2–3 seconds at the typical extrusion rates of the fibre.

The sol-gel synthesis process, which forms one of the objects of the present invention, of zirconia fibres, partially stabilized with yttria in which the composition of the partially stabilized zirconia fibres is $ZrO_2$—$Y_2O_3$, the $Y_2O_3$ ranging from 3 to 7% by weight, comprises the following steps:
- preparing a sol starting from a solution based on zirconium and yttrium nitrates, to which a thickening agent and an antifoam additive are added;
- deaerating the sol with an ultracentrifuge;
- extruding the sol with a die having a diameter ranging from 75 to 100 $\mu$m;
- causing the instantaneous gelation of the filament by passing it into a gelation bath consisting of an aqueous solution of ammonia;
- stretching the fibre in the gelation bath reducing its diameter;
- washing the fibre with distilled water and partially drying it before winding it in continuous onto an alumina ceramic roll;
- baking the fibre in an inert atmosphere at temperatures ranging from 1000 to 1200° C.

The diameter of the zirconia ceramic fibres partially stabilized with yttria is preferably between 15 $\mu$m and 25 $\mu$m.

The thickening agent is preferably selected from hydroxypropylmethylcellulose, hydroxybutylcellulose or methylcellulose.

The antifoam agent used is preferably "Contraspum konz."™.

It has also been surprisingly noted that it is possible to obtain a homogeneous and continuous coating on each single fibre by mainly applying the "dip coating" technique.

The ceramic fibres thus obtained form one of the objects of the present invention.

These zirconia ceramic fibres, partially stabilized with yttria and functionalized with a coating, are characterized in that the composition of the partially stabilized zirconia fibres is $ZrO_2$—$Y_2O_3$, the $Y_2O_3$ being between 3 and 7% by weight, and the composition of the coating contains zirconia.

The composition of the coating is preferably $ZrO_2$—$Al_2O_3$, the alumina ranging from 1 to 49% by weight.

The compostion of the coating can also contain oxides of the following elements: Cu, Ni, Co, V, Mo, W, Ce, La, Nd, in a percentage ranging from 1% to 30% by weight, present either alone or combined with each other.

The composition of the coating can also contain noble metals including: Rh, Pt, Pd, Ru, Au, in a percentage ranging from 0.1 to 2% by weight, present alone or combined with each other, or also combined with one or more of the oxides of the elements listed above.

These partially stabilized and functionalized ceramic fibres have a diameter, excluding the coating, preferably ranging from 15 $\mu$m to 25 $\mu$m, whereas the thickness of the coating is preferably between 0.4 $\mu$m and 10 $\mu$m.

These fibres can be used in numerous catalytic applications and substitute the ceramic "washcoat" of 3-way catalytic exhausts, consisting of electrically heated metallic honeycombs, in catalytic combustion and/or decomposition systems at low temperature of volatile organic or inorganic polluting compounds such as, for example $N_2O$ and in catalytically regenerable filtration systems of the diesel particulate.

The sol-gel synthesis process for obtaining partially stabilized and functionalized ceramic fibres, is characterized in that it comprises the following steps:

preparing a sol starting from a solution based on zirconium and yttrium nitrates, to which a thickening agent and an antifoam additive are added;

deaerating the sol with an ultracentrifuge;

extruding the sol with a die having a diameter ranging from 75 to 100 μm;

causing the instantaneous gelation of the filament by passing it into a gelation bath consisting of an aqueous solution of ammonia;

stretching the fibre in the gelation bath reducing its diameter;

washing the fibre with distilled water and partially drying it before winding it in continuous onto an alumina ceramic roll;

baking the fibre in an inert atmosphere at temperatures ranging from 1000 to 1200° C.;

coating the surface of the fibre with the "dip coating" technique using a sol based on zirconium nitrate, to which alumina hydrate and salts of elements capable of being transformed into oxides after calcination, and/or salts of precious metals, are added;

drying and calcining the coating;

impregnating, when necessary, the coating after creating the zirconia-alumina layer, by "incipient wetness" or another "dip coating", extracting the composite fibre from other solutions of salts of elements which cannot be directly introduced in a single step;

drying and calcining the coating a second time.

As the initial steps are the same as those described above for obtaining zirconia ceramic fibres partially stabilized with yttria, also in this process the thickening agent is preferably selected from hydroxypropylmethylcellulose, hydroxybutylcellulose or methylcellulose, whereas the antifoam agent preferably used is "Contraspum konz."™.

The process is described in more detail hereunder according to a preferred embodiment of the invention, it being understood that the scope of the invention is not limited to this preferred embodiment.

The examples included in the present application were carried out according to this preferred embodiment.

The sol is obtained by mixing two solutions based on zirconium and yttrium nitrate, a thickening agent previously dissolved in water, in this case hydroxypropylmethylcellulose (e.g. Dow Chemicals), and an antifoam agent such as, for example, "Contraspum konz" of Zschimmer & Schwarz. The gel fibres were obtained using a laboratory "Melt & Wet Spinning Unit" produced by Bradford University Research Ltd. The sol is contained in a stainless steel cylinder and is forced out at a constant rate, in the "Wet Spinning" version, first through a short tube and then through the die, using a piston inside the cylinder guided by a jackscrew driven by an electric motor. The control unit allows close regulation of the extrusion rate. A specific display indicates, in addition, the loading applied. The noble metal die is situated in our configuration underneath the surface of the gelation bath. For the synthesis of the zirconia fibres, single-hole dies with diameters of 75 ot 100 μm were used. As the presence of tiny bubbles of air in the sol can cause breakage of the filament at the outlet of the die, a preventive deaeration is required before loading into the cylinder. This is carried out with a high-velocity, ALC 4269 R chilled laboratory centrifuge. The optimum deaeration conditions are: 30 minutes at a rate of 10,000 revs/min. With respect to the methods described in literature, our process has the following advantages:

the whole spinning process is carried out at room temperature;

as a sol is being extruded, the extrusion loadings are less than those of a pregelified material and it is not necessary to heat the extrusion unit;

a "stretching" of the fibre with a contraction of the diameter (up to 35–40 μm after drying and, typically, 20 μm after baking) takes place in the gelation bath, by specific regulation of the velocity of the first group of friction rolls.

The viscosity of the sol has been optimized with respect to the particular process used and is controlled by means of a Haake RV 20 rotaviscometer. The typical viscosity measured in relation to the gradient applied, D (expressed in $s^{-1}$), is within the range of 10,000 cP at 10 $s^{-1}$, 2,000 cP at 100 $s^{-1}$. It tends towards zero for gradients of about 1,000 $s^{-1}$. With these viscosities the typical extrusion loading is about 30 Kg and the extrusion rate is about 0.35 mm/min with a 75 μm die.

After undergoing conversion to gel in the gelation bath, the fibre is pulled with the help of a second group of friction rolls into a washing bath, consisting of distilled water. The function of this bath is to remove saline deposits mainly consisting of ammonium nitrate, present on the surface of the fibre itself.

The fibre, before being wound onto an alumina ceramic roll, is then partially dried by passage in a thermally heated guide at a temperature of about 80° C. This operation is necessary to avoid adhesion of the gel fibres to each other during the final winding. The expedient of moving the fibre laterally before winding, by means of a distributor driven by an electric motor, allows this objective to be fully reached.

In the configuration which we have used and optimized, with a cylinder having a capacity of 60 $cm^3$, continuous productions of fibre in the gel state of about 1600 m, typically in about 2 hours, are possible.

The simultaneous drying and baking treatment of the fibre is carried out in a chamber oven in an argon atmosphere at maximum temperatures ranging from 1000 to 1200° C.

The hanks of ceramized fibre, thermally treated at these temperatures, have a very smooth surface morphology, whereas that of the transversal section is extremely compact with a very fine grain. The average dimensions of the crystals were evaluated both with a scanning electron microscope and with a atomic force microscope and proved to be <0.5 μm. The average diameter of the fibres is typically 20 μm. Owing to the composition of the sol, the zirconia is partially stabilized at these synthesis temperatures with tetragonal crystalline cross-linking.

The hanks thus obtained can be subjected to twisting and continuous single strand spinning, after which, with an appropriate number of reels, they can be spun with commercial equipment to form tapes or panels with various kinds of mesh, according to the different methods described in international literature and, in the specific case of ceramic fibres, according to the methods described, for example, by K. Frank [Ceram. Bull. 68–2(1989)401].

The panels thus obtained, although of interest as filters or preforms for composites with a metallic or ceramic matrix, or finally, as an insulating layer for high temperature ovens, are not particularly attractive for the catalytic field as carriers for catalysts, as a result of the reduced surface area, <1 $m^2g^{-1}$.

As already specified above, however, it has been found that it is possible to obtain a homogeneous and continuous coating on each single fibre, with a thickness varying from 0.4 μm to 10 μm, by subjecting a plait, obtained by cutting a hank transversally on the ceramic roll after baking, to the following reprocessing sequence.

The plait (or a strand, or fine tape or panel strip obtained as described above) is fixed onto a "dip-coating" station of our production. The station, driven by an electric motor with a very low number of revs, allows the samples to be extracted from the solution at different, preset rates, from 0.1 cm/hour to 3 cm/hour or more. The plait is immersed in a sol, for example having a composition of $Zro_2$—$Al_2O_3$—CuO (6%) prepared according to the procedure described in example 5 of Italian patent application MI 94/A 002588, but diluted 1:2 with distilled water and extracted, for example, at a rate of 0.1 cm/hour. It is finally dried and calcined in air at 550° C. for 3 hours.

SEM observations showed considerable homogeneity in the fibre coating, most probably due to the compatibility of the two fibre-sol materials in terms of wettability. FIG. 1 shows a section of fibre having a diameter of 21 μm, with the surface uncovered on one side to allow the thickness of the coating layer to be estimated. This was determined with image analysis connected to the scanning microscope: 0.4 μm. From the same figure, it is also possible to see the very small dimensions of the crystallites which form the fibre.

In this way, a coating with a high surface area is created (typically 200–250 $m^2g^{-1}$ at these calcination temperatures) on a fibrous structure.

Considering the section of the fibre/coating composite structure and the relative areas, however, it is easy to imagine that the fraction of mass due to the coating only represents about 2% of the overall mass of the system and that the contribution of the coating to the total surface area (about 6 $m^2g^{-1}$) is not very significant, owing to this limited weight fraction.

It is therefore necessary to increase the thickness of the coating to make the surface area of the fibre/coating composite catalytically interesting.

The estimation of the useful thickness was carried out on the basis of the following considerations: taking into consideration one of the most critical applications in the field of environmental catalysis, in terms of the extremely high space velocities (about 30,000–60,000 $h^{-1}$), i.e. that of 3-way catalytic exhausts, on the basis of the "washcoat" section which typically covers a single channel of the ceramic honeycomb (for example 1×1 $mm^2$), it is possible to estimate the catalytically active fraction of the section, about 22%.

Using our fibres, typically of 20 μm in diameter, assuming it is possible to deposit layers of varying thicknesses, from 1 to 10 μm and assuming a compact cubic packing of these, it was estimated that already starting from coating thicknesses of 2 μm, a catalytically active section area is reached which is comparable to that of honeycombs. With a thickness of 5 μm, the active area is more or less double. Even considering the difficulties in obtaining a compact cubic packing, it is still reasonable to expect a coating of this thickness, with the same surface area and coating composition as the "washcoat", to be catalytically more efficient. The main reason lies in the fact that most of the section of a washcoat in the channels of a ceramic "honeycomb" does not participate in the catalytic process: in fact, in the angles, where the "washcoat" thickness can reach 150–200 μm, it is difficult to imagine that the layers further away from the external surface of the channels can intervene to the same degree as those on the walls where the typical thickness does not exceed 10–20 μm. Our composite fibres, viceversa, make the catalytically active coating homegeneously available on the whole section.

However, whereas it is possible to obtain, with not much difficulty, a thin coating, with a thickness of <0.5 μm (compare with literature, such as "Chemistry and physical principles of the sol-gel dip process" in "Sol-gel Technology for Thin Films, Fibers, Preforms, Electronics, and Specialty Shapes", edit. Lisa C. Klein, Noyes Publications, Park Ridge, N.J., USA (1988) page 55), the production of thicker coatings in sol-gel systems is critical if not impossible. In spite of this, it has been found that, by using a sol of our preparation with an appropriately optimized viscosity, it is possible to obtain homogeneous and regular coatings. A plait of fibres with a coating having a thickness of 4 μm and a composition of oxides $ZrO_2$—$Al_2O_3$ (90–10%) was obtained under the conditions described in example 2 and its morphology in the section is indicated in FIG. 2, where the thickness of the coating and its homogeneity can be observed.

This composite catalytic structure supported on a fibre cannot be obtained using commercial ceramic fibres, for example, alumina, mullite, silica-alumina, but the use of the zirconia sol-gel fibres of the present invention, is indispensable. This is due to the fact that a carried over sample with a thickness of 0.5 μm to 10 μm is not chemically inert with respect to the carrier and that under serious aging conditions, typical of catalysis, scattering phenomena play a very important role. It is not therefore possible to propose the use of other commercial fibres, for example, alumina, owing to the presence, at times very significant, of boron, for example (even up to 14% of $B_2O_3$ used as "sintering aid"), as this could spread onto the coating. The same also goes for silica in silicoaluminous or mullitic fibres.

A further very important consideration concerns the role played by the surface of the zirconia fibre itself, which can actively participate in the catalytic reaction, as well as act as simple carrier.

Coatings have been produced with various catalytically active elements dispersed on the coating based on $ZrO_2$—$Al_2O_3$ (90–10%): Rh, Pt, Pd, Ru, Au and oxides of Cu, Ni, Co, V, Mo, W, Ce, La, Nd. The deposition procedures essentially comprise their solubilization in the form of suitable salts in the zirconium-aluminum sol, followed by "dip coating" of the fibre, or, at other times, their subsequent introduction into the precalcined coating, with the usual impregnation or "incipient wetness" techniques, described in literature, or by means of a second extraction after immersion in a solution of salts of elements which cannot be directly introduced in a single step into the initial coating. Details are provided in the individual reference examples.

Among the systems claimed in the present invention, the catalytically active fibres thus produced are combined with metallic honeycombs, consisting of a set of thin corrugated metal strips, as described in internation patent literature, in particular in applications EP 0553942 of Grace Co., DE-4306482 of Emitec Gesellschaft fuer Emissionstechnologie GmbH. In these systems, where the corrugated metallic strips are spirally wound, with intervals of metallic heating elements, connected for example to the battery in the case of a car exhaust, mattresses of ceramic fibres are already used. These mattresses however, such as the commercial mattresses NEXTEL™, INTERAM™, of 3-M, cited in application EP-0553942, are present with the sole purpose of electrically insulating the heating conductors of the honeycomb.

The purpose of the present invention is, viceversa, to substitute the catalytically active layer, consisting of ceramic oxides and noble metals, present on the corrugated strips and deposited before their spiral winding, with plaits of coated fibres as specified above. The fibre plaits which have undergone the coating process touch each other at same points, or sometimes, along a longitudinal directrix and are in some way linked to each other by the composition itself of the coating. This characteristic prevents them from being dispersed or even leaving their housing under the effect of the high space velocities of the gases. Even when the single fibre plaits are pressed in the single spaces produced by the undulation of the sheet strips of the honeycomb, as a result of what is specified above, filling factors close to the theoretical ones of the section of a compact cubic packing are never reached, and consequently losses of loading of the system are not problematical.

The main advantage deriving from a solution of this kind consists in the participation of the whole coating of each single fibre in the catalytic process, contrary to what occurs with the washcoat deposited on the undulating sheet. Another advantage consists in the perfect attachment of the coating to the carrier with a very similar composition, not only from a chemical point of view but also in terms of thermal expansion. In fact, the adhesion of the washcoat to the metal, under severe temperature conditions and repeated thermal cycles, is a big problem, with the discharge of material powder due to the crumbling of the layer.

From a technological point of view, the application of fibre plaits in the spaces of the undulating sheet is not a problem and this operation can be carried out simultaneously with the winding process which already takes place under the effect of a mechanical pressure which contributes to arranging the plaits in their housing.

The only additional expedient consists in transversally inserting a netted metal mesh onto the head and tail of the honeycomb, with a mesh span, for example if square, of about 100×100 μm, which should only serve as a barrier for the outlet of the plait under the effect of the high space velocities of the gases. In terms of loading losses of the system, this is a marginal problem. From a technological point of view, the insertion of these septa does not create any particular difficulty, as these can be welded to the honeycomb or screwed on with any simple device known in literature. The mesh span mentioned above, even if much higher than the diameter of the composite fibre, is selected in view of the fact that if a single fibre were to break, it would be very difficult for it to enter the span of the mesh but would probably settle transversally to the mesh itself.

The system claimed herein also has incredible advantages in terms of recovery and recycling of the materials, particularly of the noble metals deposited on the coating of the fibres, at the life-end of the catalytic system.

Compositions of the fibre coating, such as that specified in example 3, in relation to what is claimed above, or their use in the substitution of the ceramic washcoat in an electrically heated metallic honeycomb, are particularly suitable for use in 3-way catalytic exhausts.

Coated fibres containing an oxidation catalyst, for example as described in examples 4, 5 and 6, but not limited to these examples, can also be favourably used, optionally with marginal modifications to the electrically heated honeycomb, in combustion and/or catalytic decomposition systems at a low temperature of volatile organic compounds to be used, for example, in fume hoods. Another application is claimed in low temperature catalytic decomposition systems of gaseous emissions responsible for the greenhouse effect, such as for example $N_2O$.

Finally, these fibres can also be appropriately used in filtration systems of the diesel particulate, self-regenerating owing to the presence in the coating of metals or oxides which are catalytically active in the oxidation of carbon and organic constituents soluble therein of which the diesel particulate is formed. The classification of filtration systems of the diesel particulate is provided in patent literature, as described for example, in patent WO 92/17688 of Minnesota Mining and Manufacturing Co. In relation to these systems, preferably that claimed in the above patent, consisting of a series of perforated pipes penetrated by exhaust gases, in whose holes the diesel particulate is blocked by layers of ceramic fibres helicoidally wound around each single pipe, the insertion of the composite fibres claimed herein is particularly useful. They can form either totally or partly the filtrating layer and, as well as acting as a physical filter of the particulate, they can, above all, be conveniently used in the regeneration site of the filter itself in the catalytic combustion of the particulate retained by the same or of that possibly retained by adjacent layers of catalytically non-functionalized commercial ceramic fibres.

EXAMPLES

Some examples are provided hereunder of the synthesis of the zirconia sol-gel ceramic fibre partially stabilized with yttria, example 1, of the deposition of the basic supporting layer with a high surface area, example 2, and of the deposition of layers also containing various catalytically active elements, examples 3–6. These examples illustrate the present invention but in no way limit its scope.

Example 1

Preparation of Fibres of Zirconium Oxide Stabilized with Yttrium Oxide (5.5% by weight)

The sol-gel fibres are obtained with a laboratory "Melt & Wet Spinning Unit" produced by Bradford University Research Ltd. (UK).

Preparation of the Sol for Obtaining the Fibres:

4 g hydroxypropyl methylcellulose dispersed in 50 ml of distilled $H_2O$ thickened with a few drops of tetramethylammonium hydroxide or ammonium hydrate solution 44.4 ml of a sol of zirconium nitrates in $H_2O$ (213 g/l of $ZrO_2$) having a molar ratio $[NO_3^-]/[Zr^{4+}]=0.72$ 2.8 ml of a nitric solution of yttrium in $H_2O$ (196 g/l of $Y_2O_3$)

The whole mixture is brought to a final volume of 200 ml with distilled $H_2O$, to which a few drops of Contraspum Konz.™ are added, and vigorously stirred.

Deaeration of the Sol

The sol obtained is centrifuged at 10,000 revs/min for 30 minutes.

The typical viscosity measured in relation to the gradient applied, D (expressed in $s^{-1}$), is about 10,000 cP at 10 $s^{-1}$, 2,000 cP at 100 $s^{-1}$. It tends towards zero for gradients of about 1,000 $s^{-1}$.

The sol is transferred to a stainless steel cylinder and is forced out at a constant rate, in the "Wet Spinning" configuration of the machine, first through a short tube and then through the die, by means of a piston guided inside the cylinder by a jackscrew driven by an electric motor. The control unit allows close regulation of the extrusion rate. A specific display indicates, in addition, the loading applied.

The noble metal die is situated in our configuration underneath the surface of the gelation bath, an aqueous solution of ammonia at 30%, diluted 1:1.

For the synthesis of the zirconia fibres, single-hole dies with diameters of 75 ot 100 μm were used.

With the above viscosities, the typical extrusion loading is about 30 Kg and the extrusion rate is about 0.35 mm/min with a 75 μm die.

Gelation

The gelation takes place instantaneously downstream of the outlet in an ammonia bath. By appropriate regulation of the rate of the first group of friction rolls, the fibre is "stretched" in the gelation bath with a contraction of the diameter (up to 35–40 μm after drying and, typically, 20 μm after baking).

Washing

After undergoing conversion to gel in the gelation bath, the fibre is pulled with the help of a second group of friction rolls into a washing bath, consisting of distilled water. The function of this bath is to remove the saline deposits, mainly consisting of ammonium nitrate, present on the surface of the fibre itself.

Partial Drying

The fibre, before being wound onto a ceramic alumina roll, is then partially dried by passage in a thermally heated guide at a temperature of about 80° C. This operation is necessary to avoid adhesion of the gel fibres to each other during the final winding. The additional expedient of moving the fibre laterally before winding, by means of a distributor driven by an electric motor, allows this objective to be fully reached.

In the configuration which we have used and optimized, with a cylinder having a capacity of 60 cm³, continuous productions of fibre in the gel state of about 1600 m, typically in about 2 hours, are possible.

Thermal Treatment

The simultaneous drying and baking treatment of the fibre is carried out in a chamber oven in an argon atmosphere at maximum temperatures ranging from 1000 to 1200° C.

The hanks of ceramized fibre, baked at these temperatures, have a very smooth surface morphology, whereas that of the transversal section is extremely compact with a very fine grain. The average dimensions of the crystals were evaluated both with a scanning electron microscope and with a atomic force microscope and proved to be <0.5 μm. The average diameter of the fibres is typically 20 μm.

Example 2

Coating of the Fibres with a Layer of Zirconium Oxide-alumina (10% by weight)

Preparation of the Sol 63.4 ml of a sol of zirconium nitrates in $H_2O$ (213 g/l of $ZrO_2$) having a molar ratio $[NO_3^-]/[Zr^{4+}]=0.72$ 15 g of a solution in H2 O of alumina hydrate (10% by weight as $Al_2O_3$)

37.5 g of a solution of methylcellulose in $H_2O$ at 4% by weight the whole mixture is brought to 200 ml with distilled $H_2O$.

1 g of zirconium oxide fibres partially stabilized with yttrium oxide (5,5% by weight) is immersed in 120 ml of the sol described above and extracted at a rate of 3 cm/h.

Drying and calcination in air in a single step: 2° C./min up to the maximum temperature, then maintained for 3 hours, then cooling to room temperature. Thickness of the coating: 4 μm after calcination at 550° C.

Example 3

Coating of the Fibres with a Layer of Zirconium Oxide-alumina (7.4% by weight)-cerium Oxide (24.6% by weight)-platinum (0.98% by weight-rhodium (0.02% by weight)

Preparation of the Sol 46.5 g of $Ce(NO_3)_3.6H_2O$ 1.95 g of $H_2PtCl_6.6H_2O$ 0.038 g of $RhCl_3.3H_2O$ dissolved in 100 ml of distilled $H_2O$. The following products are then added:

236 ml of a sol of zirconium nitrates in $H_2O$ (213 g/l of $ZrO_2$) having a molar ratio $[NO_3^-]/[Zr^{4+}]=0.72$ 55.5 g of a solution in $H_2O$ of alumina hydrate (10% by weight as $Al_2O_3$)

187.5 g of a solution of methylcellulose in $H_2O$ at 4% by weight the whole mixture is brought to 1 with distilled $H_2O$.

1 g of zirconium oxide fibres partially stabilized with yttrium oxide (5,5% by weight) is immersed in 120 ml of the sol described above and extracted at a rate of 3 cm/h.

Drying and calcination in air in a single step: 2° C./min up to the maximum temperature, then maintained for 3 hours, then cooling to room temperature. Thickness of the coating: 4.5 μm after calcination at 550° C.

Example 4

Coating of the Fibres with a Layer of Zirconium Oxide-alumina (9.4% by weight)-copper Oxide (6% by weight)

Preparation of the Sol 98.7 ml of a sol of zirconium nitrates in $H_2O$ (206 g/l of $ZrO_2$) having a molar ratio $[NO_3^-]/[Zr^{4+}]=0.74$ 22.6 g of a solution in $H_2O$ of alumina hydrate (10% by weight as $Al_2O_3$)

14.4 ml of a solution of $Cu(NO_3)_2.3H_2O$ (100 g/l of CuO)

56.3 g of a solution of methylcellulose in $H_2O$ at 4% by weight the whole mixture is brought to 300 ml with distilled $H_2O$.

1 g of zirconium oxide fibres partially stabilized with yttrium oxide (5,5% by weight) is immersed in 120 ml of the sol described above and extracted at a rate of 3 cm/h.

Drying and calcination in air in a single step: 2° C./min up to the maximum temperature, then maintained for 3 hours, then cooling to room temperature. Thickness of the coating: 3.6 μm after calcination at 550° C.

Example 5

Coating of the Fibres with a Layer of Zirconium Oxide-alumina (9.4% by weight)-nickel Oxide (6% by weight)

Preparation of the Sol 98.7 ml of a sol of zirconium nitrates in $H_2O$ (206 g/l of $ZrO_2$) having a molar ratio $[NO_3^-]/[Zr^{4+}]=0.74$ 22.6 g of a solution in $H_2O$ of alumina hydrate (10% by weight as $Al_2O_3$)

22.6 ml of a solution of $Ni(NO_3)_2.6H_2O$ (63.7 g/l of NiO)

56.3 g of a solution of methylcellulose in $H_2O$ at 4% by weight the whole mixture is brought to 300 ml with distilled $H_2O$.

1 g of zirconium oxide fibres partially stabilized with yttrium oxide (5,5% by weight) is immersed in 120 ml of the sol described above and extracted at a rate of 3 cm/h.

Drying and calcination in air in a single step: 2° C./min up to the maximum temperature, then maintained for 3 hours, then cooling to room temperature. Thickness of the coating: 3.5 μm after calcination at 550° C.

Example 6

Coating of the Fibres with a Layer of Zirconium Oxide-alumina (9.4% by weight)-cobalt Oxide (6% by weight)

Preparation of the Sol 98.7 ml of a sol of zirconium nitrates in $H_2O$ (206 g/l of $ZrO_2$) having a molar ratio $[NO_3^-]/[Zr^{4+}]=0.74$ 22.6 g of a solution in $H_2O$ of alumina hydrate (10% by weight as $Al_2O_3$)

21.1 ml of a solution of $Co(NO_3)_2 \cdot 6H_2O$ (68.1 g/l of $Co_3O_4$)

56.3 g of a solution of methylcellulose in $H_2O$ at 4% by weight the whole mixture is brought to 300 ml with distilled $H_2O$.

1 g of zirconium oxide fibres partially stabilized with yttrium oxide (5,5% by weight) is immersed in 120 ml of the sol described above and extracted at a rate of 3 cm/h.

Drying and calcination in air in a single step: 2° C./min up to the maximum temperature, then maintained for 3 hours, then cooling to room temperature. Thickness of the coating: 3.7 μm after calcination at 550° C.

What is claimed is:

1. Zirconia ceramic fibres, partially stabilized with yttria, and wherein said fibres contain a coating, in which the composition of the partially stabilized fibres is $ZrO_2$—$Y_2O_3$, the $Y_2O_3$ ranging from 3 to 7% by weight, and the composition of the coating contains zirconia.

2. The ceramic fibres according to claim 1 wherein the composition of the coating is $ZrO_2$—$Al_2O_3$, the alumina ranging from 1 to 49% by weight.

3. The ceramic fibres according to claim 1 wherein the composition of the coating also contains an oxide of at least one of the following elements: Cu, Ni, Co, V, Mo, W, Ce, La, Nd, in a percentage ranging from 1% to 30% by weight.

4. The ceramic fibres according to claim 1 wherein the composition of the coating also contains at least one noble metal selected from: Rh, Pt. Pd, Ru, Au, in a percentage ranging from 0.1 to 2% by weight.

5. The ceramic fibres according to claim 1 wherein the diameter of the fibres, excluding the coating, ranges from 15 μm to 25 μm.

6. The ceramic fibres according to claim 1 wherein the thickness of the coating on the fibres ranges from 0.4μ to 10 μm.

7. A sol-gel synthesis process for preparing zirconia fibres, partially stabilized with yttria and wherein said fibres contain a coating, comprising the following steps:

preparing a sol starting from a solution based on zirconium and yttrium nitrates, to which a thickening agent and an antifoam additive are added;

deaerating the sol with an ultracentrifuge;

extruding the sol with a die having a diameter ranging from 75 to 100 μm;

causing the instantaneous gelation of the filament by passing it into a gelation bath consisting of an aqueous solution of ammonia;

stretching the fibre in the gelation bath reducing its diameter;

washing the fibre with distilled water and partially drying it before winding it in continuous onto an alumina ceramic roll;

baking the fibre in an inert atmosphere at temperatures ranging from 1000 to 1200° C.;

coating the surface of the fibre with the "dip coating" technique using a sol based on zirconium nitrate, to which alumina hydrate and salts of elements capable of being transformed into oxides after calcination, and/or salts of precious metals, are optionally added;

drying and calcining the coating;

impregnating, when necessary, the coating after creating the zirconia-alumina layer, by "incipient wetness" or another "dip coating", extracting the composite fibre from other solutions of salts of elements which cannot be directly introduced in a single step;

drying and calcining the coating a second time.

8. A sol-gel synthesis process for preparing zirconia fibres, partially stabilized with yttria wherein the composition of the partially stabilized zirconia fibres is $ZrO_2$—$Y_2O_3$, the $Y_2O_3$ ranging from 3 to 7% by weight, comprising the following steps:

preparing a sol starting from a solution based on zirconium and yttrium nitrates, to which a thickening agent and an antifoam additive are added;

deaerating the sol with an ultracentrifuge;

extruding the sol with a die having a diameter ranging from 75 to 100 μm;

causing the instantaneous gelation of the filament by passing it into a gelation bath consisting of an aqueous solution of ammonia;

stretching the fibre in the gelation bath reducing its diameter;

washing the fibre with distilled water and partially drying it before winding it in continuous onto an alumina ceramic roll;

baking the fibre in an inert atmosphere at temperatures ranging from 1000 to 1200° C.

9. The process according to claim 8 wherein the diameter of the ceramic fibres is between 15 μm and 25 μm.

10. The process according to claim 7 or wherein the thickening agent is selected from hydroxypropylmethylcellulose, hydroxybutylcellulose and methylcellulose.

11. The process according to claim 7 or wherein the antifoam agent is "Contraspum konz."™.

12. The ceramic fibres according to claim 2 wherein the composition of the coating also contains an oxide of at least one of the following elements: Cu, Ni, Co, V, Mo, W, Ce, La, Nd, in a percentage ranging from 1% to 30% by weight.

13. The ceramic fibres according to claim 2 wherein the composition of the coating also contains at least one noble metal selected from: Rh, Pt, Pd, Ru, Au, in a percentage ranging from 0.1 to 2% by weight.

14. The ceramic fibres according to claim 3 wherein the composition of the coating also contains at least one noble metal selected from: Rh, Pt, Pd, Ru, Au, in a percentage ranging from 0.1 to 2% by weight.

15. The ceramic fibres according to claim 12 wherein the composition of the coating also contains at least one noble metal selected from: Rh, Pt, Pd, Ru, Au, in a percentage ranging from 0.1 to 2% by weight.

16. The ceramic fibres according to claim 2 wherein the diameter of the fibres, excluding the coating, ranges from 15 μm to 25 μm.

17. The ceramic fibres according to claim 3 wherein the diameter of the fibres, excluding the coating, ranges from 15 μm to 25 μm.

18. The ceramic fibres according to claim 4 wherein the diameter of the fibres, excluding the coating, ranges from 15 μm to 25 μm.

19. The ceramic fibres according to claim 12 wherein the diameter of the fibres, excluding the coating, ranges from 15 μm to 25 μm.

20. The ceramic fibres according to claim 13 wherein the diameter of the fibres, excluding the coating, ranges from 15 μm to 25 μm.

21. The ceramic fibres according to claim 14 wherein the diameter of the fibres, excluding the coating, ranges from 15 μm to 25 μm.

22. The ceramic fibres according to claim 15 wherein the diameter of the fibres, excluding the coating, ranges from 15 μm to 25 μm.

23. The ceramic fibres according to claim 2 wherein the thickness of the coating on the fibres ranges from 0.4μ to 10 μm.

24. The ceramic fibres according to claim 3 wherein the thickness of the coating on the fibres ranges from 0.4μ to 10 μm.

25. The ceramic fibres according to claim 4 wherein the thickness of the coating on the fibres ranges from 0.4μ to 10 μm.

26. The ceramic fibres according to claim 12 wherein the thickness of the coating on the fibres ranges from 0.4μ to 10 μm.

27. The ceramic fibres according to claim 13 wherein the thickness of the coating on the fibres ranges from 0.4μ to 10 μm.

28. The ceramic fibres according to claim 14 wherein the thickness of the coating on the fibres ranges from 0.4μ to 10 μm.

29. The ceramic fibres according to claim 15 wherein the thickness of the coating on the fibres ranges from 0.4μ to 10 μm.

30. The process according to claim 8 wherein the thickening agent is selected from hydroxypropylmethylcellulose, hydroxybutylcellulose and methylcellulose.

31. The process according to claim 8 wherein the antifoam agent is "Contraspum konz."™

32. A process comprising combusting and/or catalytic decomposing a combustible and/or catalytic decomposable material in the presence of the zirconia ceramic fibres of claim 2.

33. A process comprising filtering diesel particulates in the presence of the zirconia ceramic fibres of claim 2.

* * * * *